(12) United States Patent
Cao (10) Patent No.: US 11,537,218 B2
(45) Date of Patent: Dec. 27, 2022

(54) SYSTEM AND METHOD FOR PROCESSING COMMANDS IN A COMPUTER-GRAPHICS SOFTWARE ENVIRONMENT

(71) Applicant: Xinlin Cao, Westmount (CA)

(72) Inventor: Xinlin Cao, Westmount (CA)

(*) Notice: Subject to any disclaimer, the term of this patent is extended or adjusted under 35 U.S.C. 154(b) by 0 days.

(21) Appl. No.: 17/427,833

(22) PCT Filed: Feb. 12, 2020

(86) PCT No.: PCT/CA2020/050184
§ 371 (c)(1),
(2) Date: Aug. 2, 2021

(87) PCT Pub. No.: WO2020/163952
PCT Pub. Date: Aug. 20, 2020

(65) Prior Publication Data
US 2022/0147163 A1 May 12, 2022

Related U.S. Application Data (60) Provisional application No. 62/804,933, filed on Feb. 13, 2019.

(51) Int. Cl.
*G06F 3/0354* (2013.01)
(52) U.S. Cl.
CPC ...... *G06F 3/03541* (2013.01); *G06F 3/03547* (2013.01)
(58) Field of Classification Search
CPC ............ G06F 3/03541; G06F 3/03547; G06F 3/04815; G06F 3/0488
See application file for complete search history.

(56) References Cited

U.S. PATENT DOCUMENTS

| 7,814,429 | B2 | 10/2010 | Buffet et al. |
| 10,063,660 | B1 | 8/2018 | Coldham et al. |
| 2008/0001919 | A1 | 1/2008 | Pascucci |
| 2015/0312617 | A1* | 10/2015 | Chen ................. G06F 3/03547 348/734 |
| 2017/0142245 | A1* | 5/2017 | Lin .................. H04M 1/72409 |

OTHER PUBLICATIONS

Canadian Intellectual Property Office; International Search Report; dated May 6, 2020; entire document.

* cited by examiner

*Primary Examiner* — Rodney Amadiz
(74) *Attorney, Agent, or Firm* — Price Heneveld LLP (57) ABSTRACT

A method and system for processing control commands in a computer-graphics (CG) environment includes displaying a CG environment according to a current view setting. A first user command generated from user interaction with a touch-enabled first input device is received. The command defines an adjustment to the current view setting. The displaying of the CG environment is adjusted in accordance with the view adjustment defined by the first user command. A second user command generated from user interaction with a second input device other than the touch-enabled first input device is received. The second user command defines a CG creation/editing action within the CG environment. The application of the CG creation/editing action defined by the second user command is then displayed. The first and second input devices may be physically separate and the first and second user commands may be logically separate.

17 Claims, 10 Drawing Sheets

SYSTEM AND METHOD FOR PROCESSING COMMANDS IN A COMPUTER-GRAPHICS SOFTWARE ENVIRONMENT

RELATED PATENT APPLICATION

The present application claims priority to International Patent Application PCT/CA2020/050184 filed Feb. 12, 2020, entitled "SYSTEM AND METHOD FOR PROCESSING COMMANDS IN A COMPUTER-GRAPHICS SOFTWARD ENVIRONMENT," which claims priority from U.S. Provisional Patent application No. 62/804,933, filed Feb. 13, 2019 and entitled "SYSTEM AND METHOD FOR PROCESSING COMMANDS IN A COMPUTER-GRAPHICS SOFTWARE ENVIRONMENT", the disclosures of which are hereby incorporated by reference in their entirety.

TECHNICAL FIELD

The present disclosure generally relates to systems and methods for receiving control commands generated from user interaction with user input devices and for processing the control commands in a computer-graphics (CG) environment.

BACKGROUND

Computer graphics involves the use of computer systems to aid in the creation, modification, analysis or optimization of a graphic or design. Typically, a user uses a CG software to carry out a CG creation session. The CG software generates a CG environment that includes a CG space in which creation and editing of CG objects can be carried out. The CG environment is displayed on an electronic display device, usually in real-time, to provide visual feedback to the user.

During the session, a user will typically interact with different user input devices, such as a computer mouse, keyboard, and/or other computer peripherals. The user's interaction with the user input devices are translated into control commands that define how the CG environment is to be modified. Modification of the CG environment includes changing the view setting of the environment and the actual creation/editing of the CG objects within the environment.

Accurate and efficient generation of control commands through interaction with the user input devices can ensure accurate and efficient creation/editing of the CG objects. However, effective generation of control commands can be limited by standard user input devices, such a keyboard and mouse.

Additional computer peripherals are available to provide different user interaction mechanics with the goal of improving generation of control commands.

U.S. Publication No. 20080001919 provides a device for manual input of control signals in a computer-related environment, the device comprising: a base for supporting the device on a surface; a first input member mounted on the base for rotary movement about an axis extending generally upwardly from the base, the first input member having an axial extent from an end region proximal the base to an end region distal from the base and enclosing a central space within which a sensor arrangement is housed for detecting and interpreting rotary movement of the first input member relative to the base, the first input member having an opening at each of its proximal and distal end regions; and a pair of second input members provided at or adjacent said distal end region of the first input member, each of said second input members comprising a switch or relay adapted to be actuated by application of finger pressure. Rotary movement of the first input member and/or actuation of the second input members is adapted to generate a corresponding control signal within the computer environment. Similar devices, such as the SpacePilot Pro are also available.

Users will continue seeking new or improved systems and methods for interacting with input devices to generate control commands when working with a CG environment to achieve greater effectiveness, accuracy, intuitiveness, user-friendliness and/or efficiency.

SUMMARY

According to one aspect, there is provided a method for processing control commands in a computer-graphics (CG) environment. The method includes displaying a CG environment according to a current view setting, receiving a first user command generated from user interaction with a touch-enabled first input device, the first user command defining an adjustment to the current view setting, adjusting the displaying of the CG environment in accordance with the view adjustment defined by the first user command, receiving a second user command generated from user interaction with a second input device other than the touch-enabled first input device, the second user command defining a CG creation/editing action within the CG environment, and displaying, within the CG environment, application of the CG creation/editing action defined by the second user command.

According to another aspect, there is provided a system for processing control commands for a computer aided design environment. The system includes a memory for storing a plurality of instructions and a data storage device. The processor is coupled to the memory and is configured for making available a CG environment, receiving a first user command generated from user interaction with a touch-enabled first input device, the first user command defining an adjustment to the current view setting, adjusting the displaying of the CG environment in accordance with the view adjustment defined by the first user command, receiving a second user command generated from user interaction with a second input device other than the touch-enabled first input device, the second user command defining an object creation/editing action for creation/editing of a design object within the CG environment, and displaying, within the CG environment, application of the object creation/editing action defined by the second user command.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art, that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

One or more systems and methods described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, personal computer, cloud based program or system, laptop, personal data assistance, cellular telephone, smartphone, tablet device or game console.

Each program is preferably implemented in a high level procedural or object oriented programming, functional programming language and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

Furthermore, the system, processes and methods of the described embodiments are capable of being distributed in a computer program product comprising a computer readable medium that bears computer-usable instructions for one or more processors. The medium may be provided in various forms including one or more diskettes, compact disks, tapes, chips, wireline transmissions, satellite transmissions, internet transmission or downloadings, magnetic and electronic storage media, digital and analog signals, and the like. The computer-usable instructions may also be in various forms including compiled and non-compiled code.

"CG environment" herein refers to a digitally represented environment in which a user creates and edits digitally represented CG objects. The CG environment will include a creation space that can be represented visually. This may be a two-dimensional or three-dimensional space. CG objects that are created are represented visually in the creation space of the CG environment. The CG environment can also include various graphical user interfaces allowing the user to select various options in the creation/editing of CG objects. The CG environment can be used to edit videos, photos, drawings, or computer-generated objects. The CG environment includes computer-aided design (CAD environments).

"Touch-enabled input device" herein refers to an electronic device operable to capture gestures made by a user contacting a capture surface of the device. The contacting can be made from the user's finger(s) directly touching the capture surface or from the user manipulating a tool, such as a stylus, to contact the capture surface. The touch-enabled input device can include a touchscreen, which has a touch-enabled layer that allows a user to make gestures by touching the screen and an electronic visual display laid under the touch-enabled layer.

"Adjusting the view setting of the CG environment" or variants thereof herein refers to how the creation space of the CG environment is visually represented, such as when displayed on an electronic display device.

"CG creation/editing" or variants thereof herein refer to an action performed by a user within the CG workflow. The creation/editing action may be the generation of data that represent CG models or designs (hereinafter "CG object"). In addition to storing the CG data, the data can also be used to generate visual representation of the CG models or designs within the CG environment. CG creation/editing can include creating a CG object, adding to a created CG object, modifying a CG object (visually perceptible property or non-visual property), and deleting a created CG object. The CG creation/editing action can also include selecting a CG object or providing an annotation within the CG environment.

Figure 1:
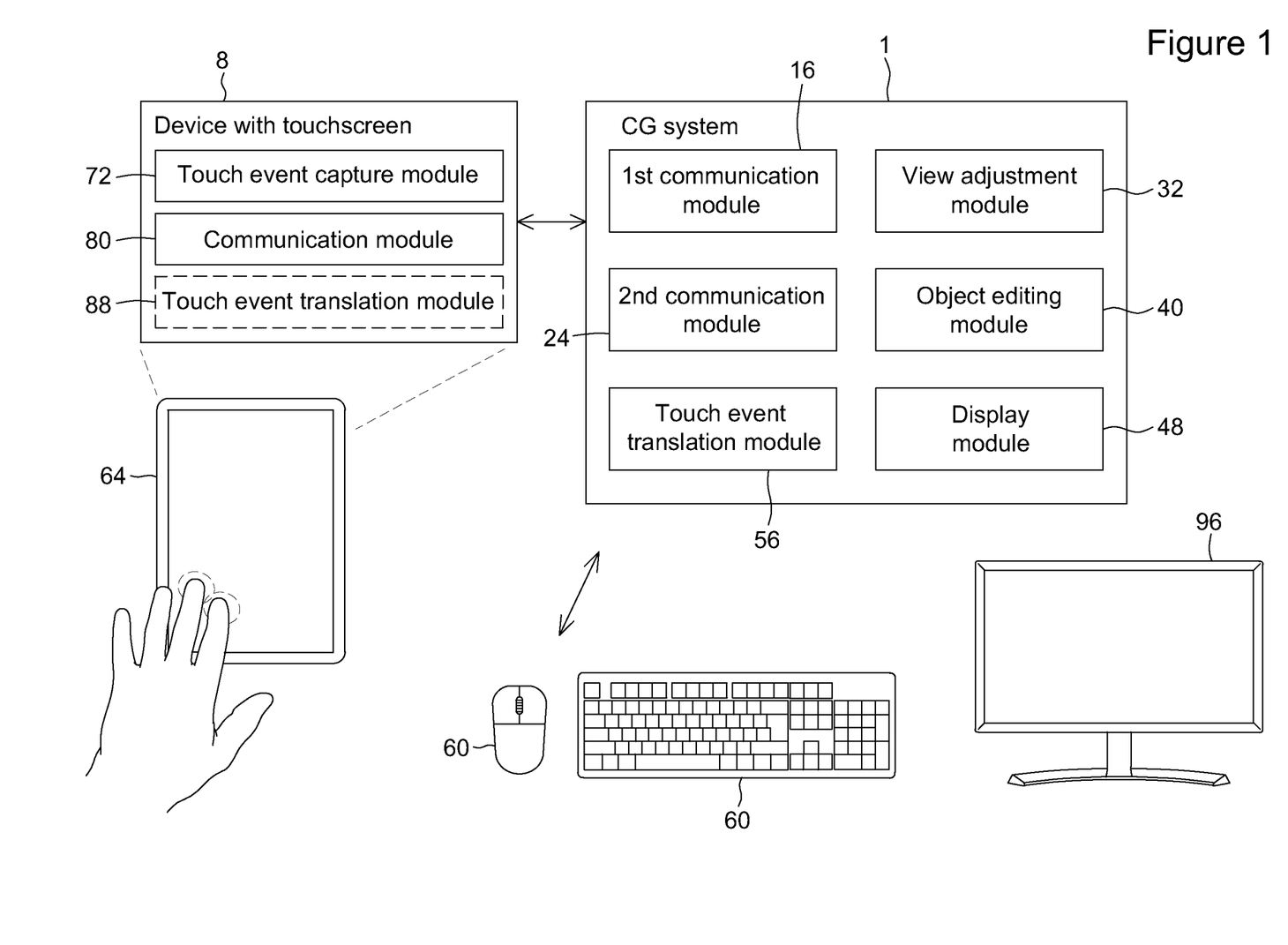
FIG. 1 illustrates a schematic diagram of the operational modules of a computer-implemented CG system according to one example embodiment.

Referring now to FIG. 1, therein illustrated is a schematic diagram of the operational modules of a computer-implemented (computer-graphics) CG system 1 according to one example embodiment. The CG system 1 includes known hardware and software modules for execution of a CG software, which may be known CAD software such as Tinkercad, Solidworks, AutoCAD, Adobe Illustrator, Adobe Photoshop, etc. A proprietary CG software for use with touch-inputted control commands is also contemplated. To not obscure embodiments described herein, such hardware and software modules are not illustrated herein. For example, the CG system 1 may be implemented on a desktop computer, tablet device, laptop, workstation, or cloud-based system.

The CG system 1 is configured to process control commands for navigating and creating/editing design objects within a CG environment in which at least some of the control commands are inputted from user interaction with a touch-enabled input device 8.

According to one example embodiment, and as illustrated, the CG system 1 includes a first communication module 16, a second communication module 24, a view adjustment module 32, an object editing module 40 and a display module 48. The CG system 1 can optionally include a gesture translation module 56, as described elsewhere herein. One or more of the modules may be implemented as software modules that already form part of the CG software executing on the CG system 1.

The first communication module 16 is configured to receive one or more first user commands generated using the touch-enabled input device 8. The user commands generated from use of the touch-enabled device 8 define how the view of the CG environment should be adjusted.

More particularly, the first user commands are generated from a user interacting with the touch-enabled input device 8. The user interacts with the touch-enabled input device 8 by executing finger or hand gestures on the capture surface 64 of the touch-enabled input device 18. The gestures can include one or more of the following:

Single tap;
Multi-tap (consecutive repeated taps);
Single point slide/drag/swipe;
Multi-point slide/drag/swipe;
Pinch;
Spread;
Etc.

The capture surface 64 can be a multi-point capture surface.

The touch-enabled input device 8 includes the capture surface 64, a gesture capture module 72 and an input-side communication module 80. The touch-enabled input device 8 may optionally include a gesture translation module 88 according to some example embodiments.

The gesture capture module 72 is configured to capture the gestures made by the user on the capture surface 64 and generate raw data that is representative of the gestures.

The gesture translation module 88 is configured to receive the raw data that is representative of the captured gestures and to determine view adjustment commands corresponding to those captured gestures. For example, based on properties of the captured gestures, the gesture translation module 88 can determine a corresponding type of view adjustment, a direction of the view adjustment of that type, and a magnitude of the view adjustment of that type.

The view adjustment defined by the first user command generated from user interaction with the touch-enabled input device 8 may include rotation of the CG creation space, translation of the CG creation space and zoom of the CG creation space. The view adjustment may also include adjusting to a predefined setting, such as switching to a predefined view (ex: orthographic view, elevation view, plan view etc.) or zooming to fit to display area.

The input-side communication module 80 of the touch-enabled input device 8 is configured to transmit first user commands generated from the user interaction with the capture surface 64. The first user commands generated from the user interaction with the touch-enabled 64 can be transmitted in the form of the raw gesture data outputted from the gesture capture module 72.

Where the touch-enabled input device 8 includes the gesture translation module 88 and the raw gesture data is translated to view adjustment commands, the input-side communication module 80 can be operable to transmit the translated view adjustment commands as the first user commands.

Alternatively, the first user commands can be transmitted by the input-side communication module 80 in an intermediate format. Within this first user commands, the captured raw gesture data has undergone some processing/translation to generate the intermediate format. However, this intermediate format requires further processing to obtain view adjustment commands.

The first user commands transmitted from the touch-enabled input device 8 are received by the first communication module 16 of the CG system 1. Where the received first user commands are already in a format defining the view adjustment commands, these may be forwarded to the view adjustment module 32 of the CG system 1.

Where the received first user commands are not yet in a format defining the view adjustment commands, the CG system 1 is provided with the system-side gesture translation module 56. The gesture translation module 56 performs any required translation of the received first user commands to output view adjustment commands usable by the view adjustment module 32. The system-side gesture translation module 56 may be implemented as drivers installed on the CG system 1 and/or as a software add-on to the CG software implementing the CG environment.

The view adjustment module 32 is configured to adjust the view setting within the CG environment in accordance with the view adjustment defined by the received first user command. Typically, an object under design will be visible within the displayed CG environment and the view adjustment will change how the design object is viewed. However, it will be understood that the view adjustment changes one or more of the orientation of the axes of the CG creation space visually represented in the CG environment, the scaling of one or more axes of the visually-represented CG creation space, and linear position along one or more axes of the visual-represented CG creation space. Accordingly, the view within the CG environment is adjusted even where an object under design is not visible or not present within the design space.

Continuing with FIG. 1, the second communication module 24 is configured to receive at least one second user command. The second user command is generated from user interaction with an input device other than the touch-enabled input device 8. The second user command may be generated by a non-touch-enabled input device 60. The second user command may be a CG creation/editing action that is not based on a text entry (i.e. an action that is not defined by the user using text-based programming code or script).

The second user command can be generated from user interaction with an input device typically used during a CG creation session, such as a mouse or keyboard. Other types of input devices suitable for receiving a user interaction and generating the second user command are also contemplated. These may include a voice recognition subsystem (ex: microphone and signal processor), a hand-gesture capture device, an eye-tracking device, a tablet and stylus subsystem, a specialized CG design control device (ex: SpacePilot, or the like).

The second user command defines an object creation/editing action. This user command is transferred to the object editing module 40, which performs the creation/editing action within the CG environment in accordance with the second user command. The creation/editing action creates or edits a CG object, the action can include storing CG data that digitally represents the created/edited design object. The creation or editing action can also be visually represented within the displayed CG environment substantially in real time.

The display module 48 is configured to display the CG environment on an electronic display device 96, such as a computer monitor or television. The display module 48 updates the displayed CG environment in response to any changes to the CG environment, such as a creation or editing of a displayed design object or adjustment to the view setting of the CG environment. More particularly, the display module 48 can update the displayed CG environment in accordance with the adjustment defined by the first user command and applied by the view adjustment module 32. Similarly, the display module 48 can update the displayed CG environment in accordance with the creation/editing defined in the second user command and applied by the object editing module 40.

It will be understood that the one or more first user commands generated from user interaction with the touch-enabled input device 8 and received by the first communication module 16 are independent from the second user commands generated from user interaction with another input device and received by the second communication module 24. That is, the first user commands are received separately from the receiving of the second user commands. For example, they may be received over independent/separate data communication channels. Put another way, the first user commands from the touch-enabled input device and the second user commands from the other input device are logically separated from one another. Logically separated herein refers to the CG system 1 being able to receive and process the first user commands and the second user commands without a conflict between the user commands.

The first user commands being independent from the second user commands allows these commands to be interpreted and treated independently from one another. For example, and as described elsewhere herein, the first user commands and second user commands can be received simultaneously at the CG system 1, and view adjustment in accordance with the first user commands and object creation/editing in accordance with the second user commands can also be carried out simultaneously.

According to one example embodiment, the second user command generated by the second input device is in a computer mouse protocol. The second user command can be a computer mouse or trackpad (ex: of a laptop). Alternatively, the second user commands are provided as if they had been generated by a computer mouse. The computer mouse protocol will typically define how a cursor/pointer is to be moved within a graphical user interface, such as, within an operating system.

It was observed that various currently available input devices other than a standard computer mouse or trackpad, including various peripherals specially designed for CG design projects, generate commands in the computer mouse protocol. For example, a monitor having a touchscreen will generate commands in the computer mouse protocol. That is, the commands are generated as if they had been generated from interaction with a computer mouse. It was further observed that in such situations, the commands generated by the input devices will conflict with commands made by the computer mouse. For example, simultaneously entered interactions with a touchscreen monitor and with a computer mouse of a same computing device will create a conflict because they will be interpreted as commands from a single mouse.

According to this example embodiment, the first user commands are received in a protocol other than a computer mouse protocol. Accordingly, the first user commands will not conflict with the second user commands provided in the computer mouse protocol. It will be understood that the other input device generating the second user commands can be a touch-enabled device (ex: trackpad, touchscreen monitor of a laptop or desktop, tablet and stylus) but generates the second user commands in the computer mouse protocol.

It will be appreciated that having second user commands in a computer mouse protocol and first user commands in another protocol avoids conflict between the first and second user commands and allows the first and second user commands to be interpreted simultaneously.

According to various example embodiments, the touch-enabled input device 8 is physically separate from the second input device 60. The user can use a first hand to interact with the touch-enabled input device 8 and can use another hand to interact with the second input device 8.

According to various example embodiments, the touchscreen input device 8 is external to the CG system 1. The touch-enabled input device 8 can transmit first user commands to the CG system 1 via a wireless communication, such as Wi-Fi, Bluetooth, or a Near Field Communication.

In one example embodiment, the second input device 60 may be embedded in a computing device (ex: desktop computer or laptop) that implements the CG environment. For example, the second input device 60 can be a touchscreen monitor of the desktop computer or laptop. In such an embodiment, the touch-enabled input device is external to the computing device.

Figure 2:
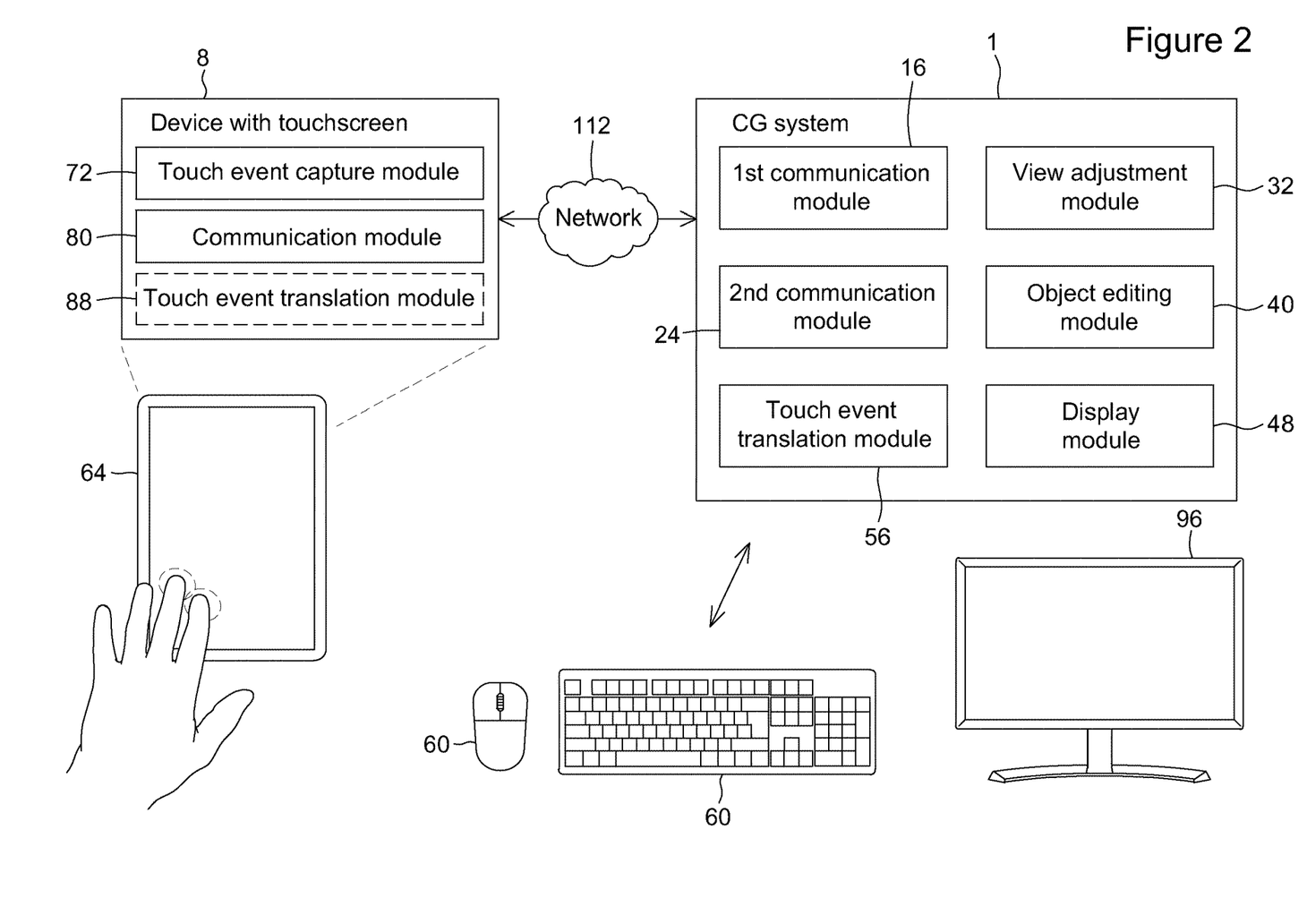
FIG. 2 illustrates a schematic diagram of the operational modules of a CG system according to an alternative example embodiment.

Referring now to FIG. 2, therein illustrated is a schematic diagram of the operational modules of a CG system 1 according to an alternative example embodiment. According to this example embodiment, the touch-enabled input device 8 is in communication with the CG system 1 via an intermediate network 112. The intermediate network 112 refers to a network infrastructure that can be used by a plurality of computer-implemented systems other than the touch-enabled input device 8 and the CG system 1. For example, the intermediate network 112 can be a local area network or a wide area network (ex: Internet, cloud-based network).

According to the alternative embodiment, the first user commands can be uploaded from the touch-enabled input device 8 to an external device located in the intermediate network 112. The external device can be a dedicated server or a cloud-based server. This external device is also in communication with the CG system 1 and the first user commands received at the external device are then routed to the CG system 1. For example, the first user commands can be transmitted from the touchscreen input device 8 to the CG system 1 using an Internet Protocol (ex: HTTP).

It will be appreciated that the external device can be located remotely of the touch-enabled input device 8 and the CG system 1. By contrast, the touch-enabled input device 8 and the CG system 1 are located in the vicinity of one another. It will be appreciated that the touchscreen input device 8, the second input device 60 and the electronic display device 96 will typically be within reach of a user working with the CG environment in that the user will interact with the touch-enabled input device 8, the second input device 60 and will be viewing the electronic display device 96. However, the user will be out of reach of the external device.

According to such an alternative embodiment where the first commands are communicated over the intermediate network 112, the CG system 1 is implemented on a first computing device and the touchscreen input device 8 can be implemented on a second computing device. For example, the first computing device can run a first operating system that further executes the CG software providing the CG environment. The touchscreen input device 8 can run a second operating system that executes software modules for capturing the touchscreen gestures and for communicating the first user commands to the CG system 1 over the intermediate network 112. Translation of the touchscreen gestures can also be implemented in software modules running in the operating system of the touchscreen input device 8.

The touchscreen input device 8 can be a mobile computing device having a touchscreen 64, such as a smartphone, tablet or game console. The operating system of the touchscreen input device 8 can be a mobile operating system, such as iOS or Android. The modules of the touchscreen device 8 can be implemented as mobile apps running within the mobile operating system.

Advantageously, communicating the first user command via the intermediate network 112 and having the touchscreen input device 8 being a standalone computing device 8 allows the user to interchangeably use any input device 8 having an appropriate capture surface 64 to generate first user commands for adjusting the view within the CG environment. For example, a user account associated with a particular user can be created and stored within a web-based platform implemented on a server, web or cloud-based system connected to the intermediate network 112. Accordingly, the user can log into the platform using the user account using any suitable touchscreen input device 8. First user commands generated by the user while logged into the user account are associated with that account.

The user account can be further associated with the CG software implementing the CG environment on the CG system 1. For example, the user working in the CG environment will also log into the server, web or cloud-based platform using the given user account. Accordingly, a user will be logged in from the touchscreen input device 8 using a given user account. The user will also be logged in from the CG system 1 using the same given user account. First user commands received from the touch-enabled input device 8 can then be routed to the CG system 1 based on the association by both the touch-enabled input device 8 and the CG system 1 to the same user account.

Figure 3:
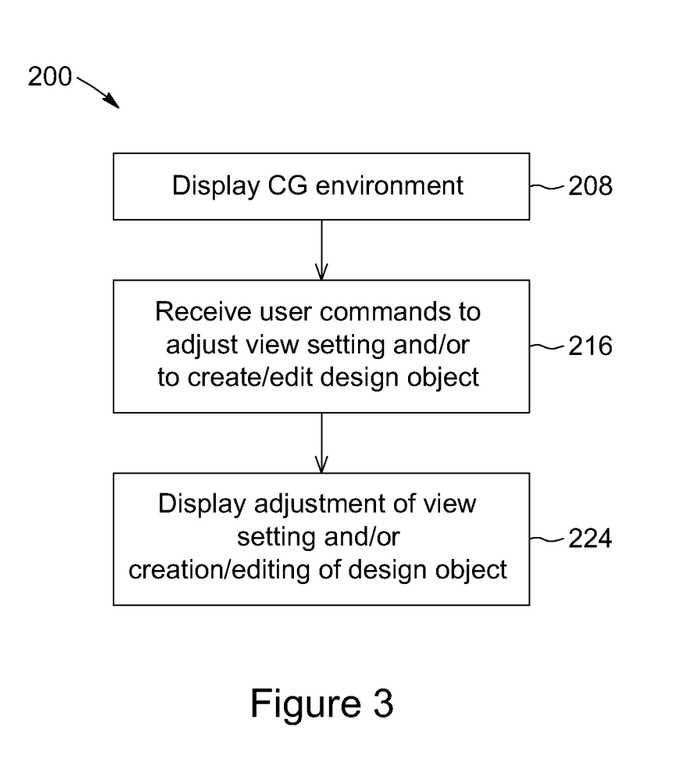
FIG. 3 illustrates a flowchart showing the operational steps of a method for processing control commands in a CG environment according to an example embodiment.

Referring now to FIG. 3, therein illustrated is a flowchart showing the operational steps of a method 200 for processing control commands in a CG environment.

At step 208, the CG environment is displayed according to a current view setting. The CG environment may be empty or can contain one or more in-progress CG design objects. Any in-progress CG design objects are also displayed in their respective current state.

At step 216, at least one user command is received. The at least one user command can include at least one first user command defining at least one adjustment to be made to the current view setting within the CG environment. Alternatively, or additionally, the at least one user command can include at least one second user command defining at least one creation/editing action. It will be understood that that the at least one user command can include both a first user command and a second user command. As described elsewhere herein, the first user command is received at the first communication module 16 and the second user command is received at the second communication module 24.

At step 224, the at least one user command received at step 216 is applied and displayed within the CG environment. Where the at least one user command includes a first user command, the view setting within the CG environment is adjusted in accordance with the adjustment defined in the first user command. Upon completion of the adjustment, the adjusted view setting becomes the current view setting of the CG environment.

Where the at least one user command includes a second user command, an object of the CG environment is created or edited in accordance with the creation/editing action defined by the second user command.

Application of the adjustment to the view setting is carried out by the view adjustment module 32 and application of the object creation/editing action is carried out by the object editing module 40.

The creation/editing of the object is also displayed on the electronic display device and carried out by the display module 48. Upon completion of the creation/editing, the state of the object after having the creation or editing applied to it becomes the current state of the object.

Method 200 can be repeated for further received first user commands or second user commands.

According to various example embodiments, a first user command and a second user command can be received at substantially the same time. Receiving a first user command and a second user command at substantially the same time herein refers to a situation in which a user command is received while the application of an action (view adjustment or creation/editing action) defined in another user command is still ongoing.

In one situation, a first user command is received, the view setting is adjusted in accordance with the first user command, and a second user command is received at the CG system 1 prior to completing the view adjustment. For example, a user touchscreen gesture can be a swipe and hold gesture to define a continuous rotation of the camera to apply a rotation view setting adjustment. While the camera is still being rotated, a second user command is received to create/edit a CG object.

In another situation, a second user command is received, an object is edited or created in accordance with the second user command, and a first user command is received at the CG system 1 prior to completing the editing/creating action.

According to various example embodiments wherein a first user command and a second user command are received at the substantially the same time, the actions defined in both the first user command the second user command can be applied at substantially the same time. The application of the actions can also be displayed at the same time and in real time to provide visual feedback to the user. It will be understood that the first user command and second user command are received independently and are logically separate from one another. The first user command and the second user command are therefore also processed separately when received at the substantially the same time. However, the application of actions defined by these commands will appear to occur at the same time and in real-time for the user.

Figure 4:
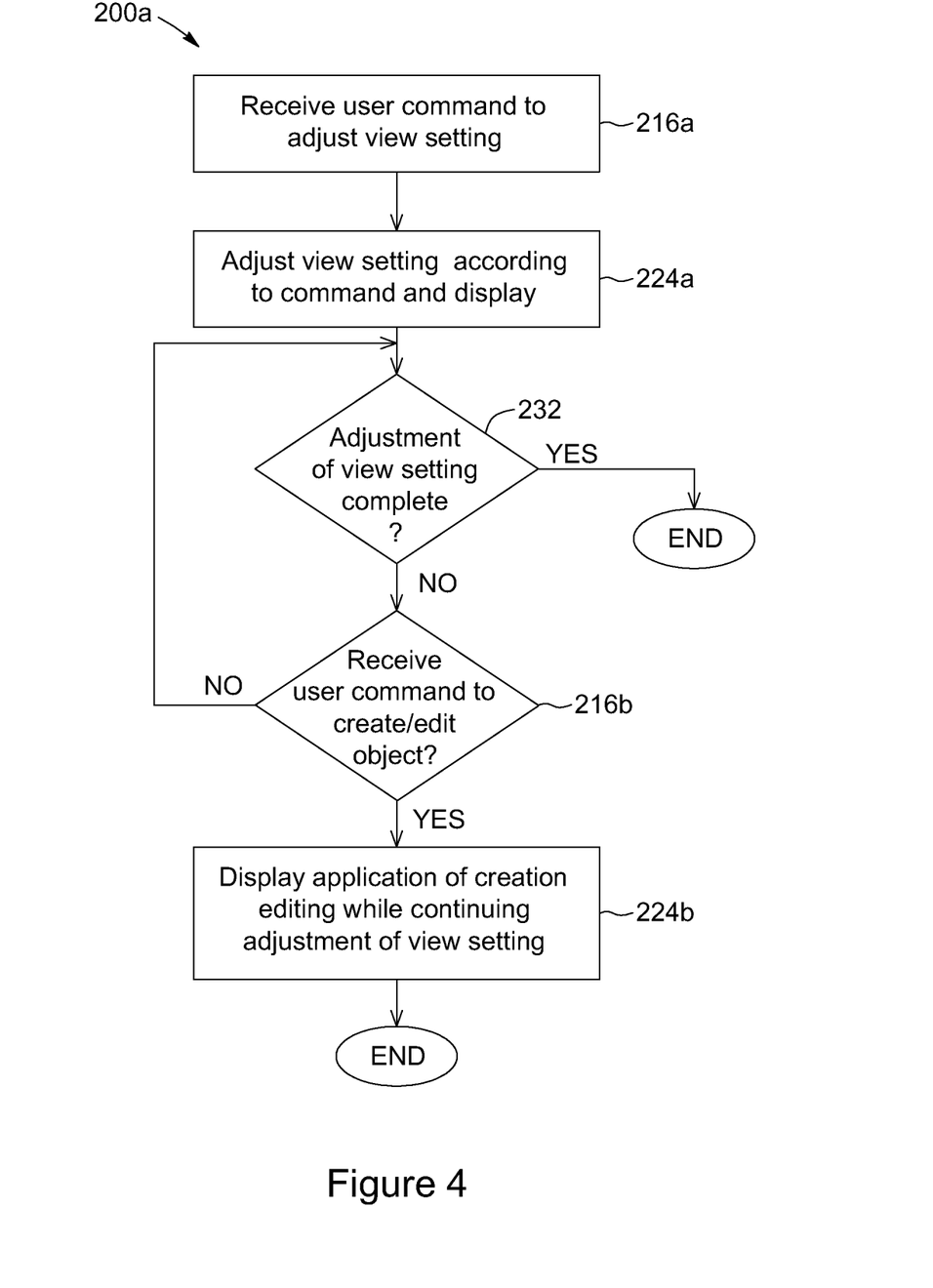
FIGS. 4 and 5 illustrate flowcharts of the operational steps of exemplary methods for applying design object creation/editing and view setting adjustment at substantially the same time.

Referring now to FIG. 4, therein illustrated is a flowchart of the operational steps of a method 200a for applying view setting adjustment and design object creation/editing at substantially the same time according to one embodiment. FIG. 4 illustrates the steps of a method in which a first user command is received before or at the same time as a second user command.

At step 216a, a first user command defining an adjustment to the view setting is received.

At step 224a, adjustment of the view setting according to the first user command is carried out. The adjustment to the view setting can also be displayed substantially in real time on the electronic display device 96.

At step 232, it is determined whether the adjustment of the view setting has been completed. For example, where the initial first user command defines an ongoing view adjustment (ex: continuous rotation), another user command can be received that defines the end of adjustment.

If the adjustment of the view setting is complete, the iteration of method 200a is ended and the adjusted view setting becomes the current view setting for the CG environment.

If the adjustment of the view setting is not yet complete, the method 200a proceeds to step 216b to determine if a second user command has been received defining an object creation/editing action.

If a second user command is not received, the method 200a returns to step 232 to monitor for completion of the view setting adjustment or the receiving of a second user command.

If a second user command is received at step 216b, the method 200a proceeds to step 224b to apply the creation/editing of the design object at the same time as the ongoing view adjustment. The creation/editing of the design object is displayed at substantially the same time as the adjustment of the view setting. The creation/editing and the adjustment of the view setting can be displayed substantially in real-time as the user makes the interactions to generate first user command received at step 216a and the second user command received at step 216b.

The iteration of the method 200a is ended upon completion of the view setting adjustment and the object creation/editing action. It will be understood that while the example of method 200a shows a single second user command being received and applied while adjustment of the view setting is ongoing, in other iterations of method 200a, a plurality of second user commands can be received and applied while adjustment of the view setting is ongoing.

Figure 5:
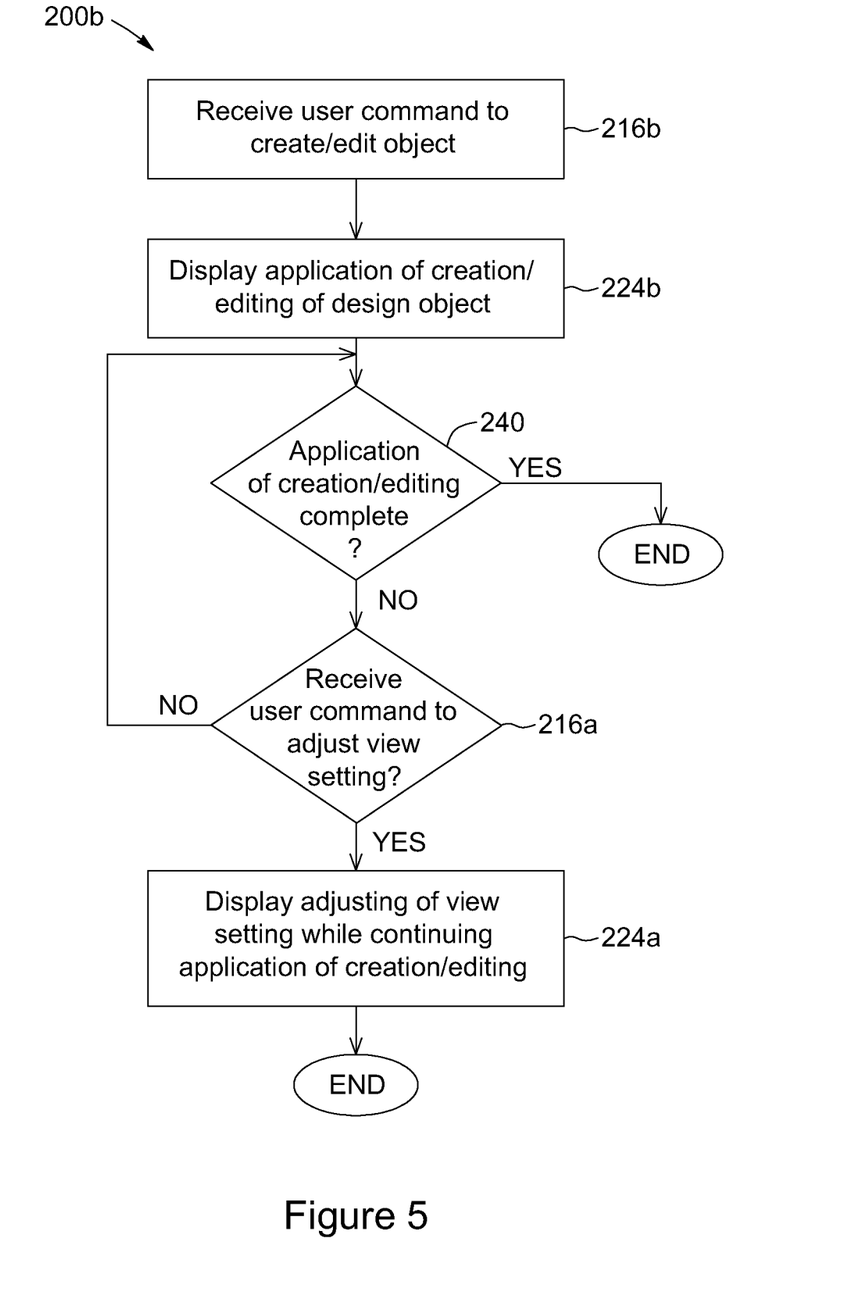

Referring now to FIG. 5, therein illustrated is a flowchart of the operational steps of a method 200b for applying design object creation/editing and view setting adjustment at substantially the same time according to one embodiment. FIG. 5 illustrates the steps of a method in which a second user command is received before or at the same as a first user command.

At step 216b, a second user command defining a creation/editing action is received.

At step 224b, application of the creation/editing action according to the received second user command is carried out. The application of the creation/editing action can also be displayed substantially in real time on the electronic display device 96.

At step 240, it is determined whether the application of the creation/editing action been completed. For example, where the initial second user command defines an ongoing creation/editing action, another user command can be received that defines the end of the creation/editing action. For example, the initial second user command can be a mouse click and mouse drag for creation of a design object. The size and shape of a proposed object to be created is displayed in the CG environment and is modified based on further mouse drag gestures made by the user. Creation/editing of the object is only applied upon a further second user command corresponding to the user releasing the clicked mouse button.

If the creation/editing action is complete at step 240, the iteration of method 200b is ended and the created/edited design object becomes the current state of the design object within the CG environment.

If the creation/editing action is not yet completed at step 240, the iteration of method 200b proceeds to step 216a to determine if a first user command has been received defining a view adjustment to the CG environment.

If a first user command is not received, the method 200b returns to step 240 to monitor for completion of the application of the object/editing action and/or the receiving a first user command.

If a first user command is received at step 216a, the method 200b proceeds to step 224a to applying the view adjustment at the same time as the ongoing creation/editing action. The application of the view adjustment is displayed at substantially the same time as the creation/editing of the design object. The creation/editing and the adjustment of the view setting can be displayed substantially in real-time as the user makes the interactions to generate the first user command received at step 216a and the second user command received at step 216b.

The iteration of the method 200b is ended upon completion of the view setting adjustment and the object creation/editing action. It will be understood that while the example of method 200b shows a single first user command being received and applied while applying the ongoing creation/editing of the object, in other iterations of method 200b, a plurality of first user commands can be received and applied while adjustment of the view setting is ongoing.

Figure 6:
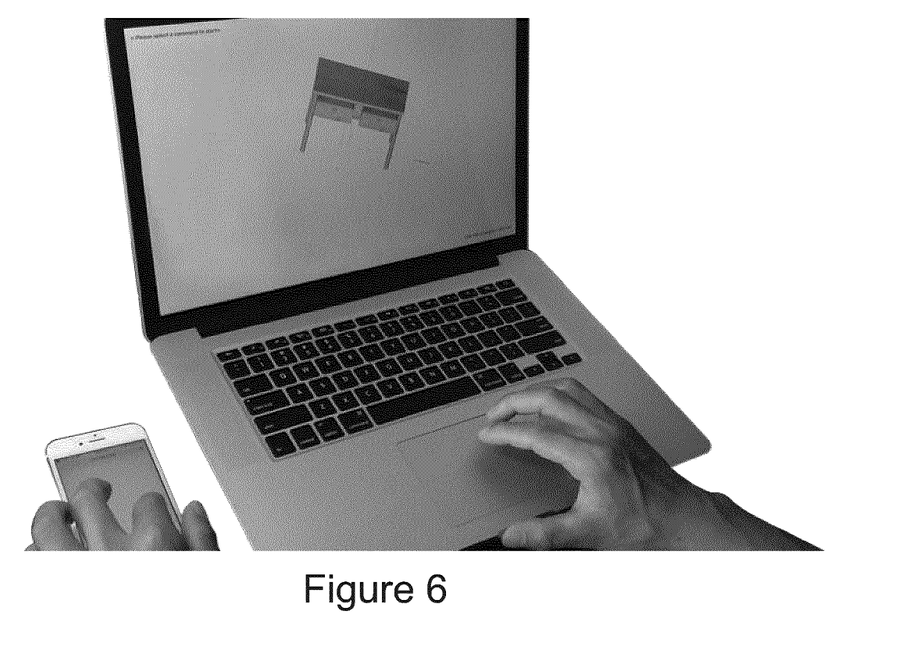
FIGS. 6 to 15 are captures made at various times during an ongoing CG session showing user interactions with input devices and the displayed CG environment.

FIG. 6 is a capture during an ongoing CG session at a first point in time. It will be observed that the CG system in this example is a laptop having a touchpad and a keyboard. The touchscreen input device in this example is a smartphone that is in wireless communication with the laptop. The user is interacting with the touchscreen of the touchscreen input using their left hand. More particularly, the user has pressed near the right edge of the touchscreen. The user's right hand is suspended above the touchpad and is not currently interacting with the touchpad.

Figure 7:
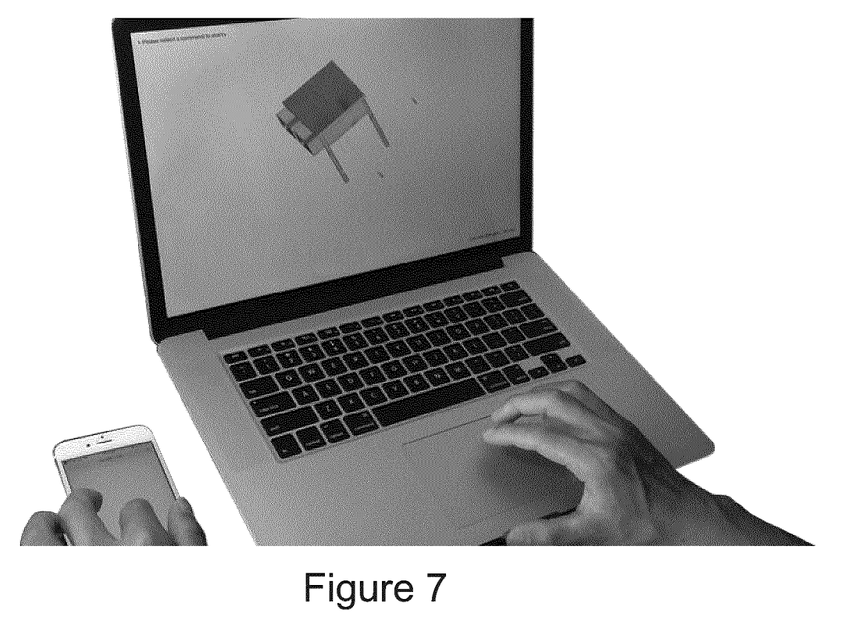

FIG. 7 is a capture made at a second point in time during the ongoing CG session. The user has continued the touchscreen gesture with their left hand by dragging the pressed finger towards the left edge of the touchscreen. This gesture generates a first user command defining a rotation of the view setting. The screen of the laptop, being the electronic display device of the CG system, now displays that the view setting has been adjusted in accordance with this rotation.

Figure 8:
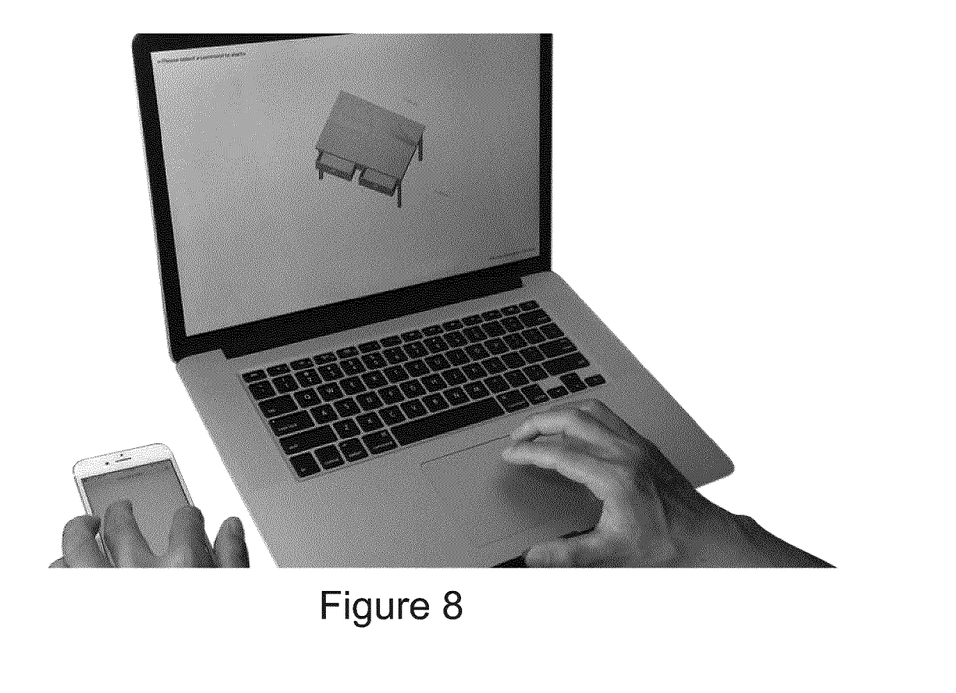

FIG. 8 is a capture made at a third point in time during the ongoing CG session. The user has now made a gesture of a multi-point press of the touchscreen in which the two contact points on the touchscreen are spread apart. The user's right hand remains suspended above the touchpad and is not currently interacting with the touchpad.

Figure 9:
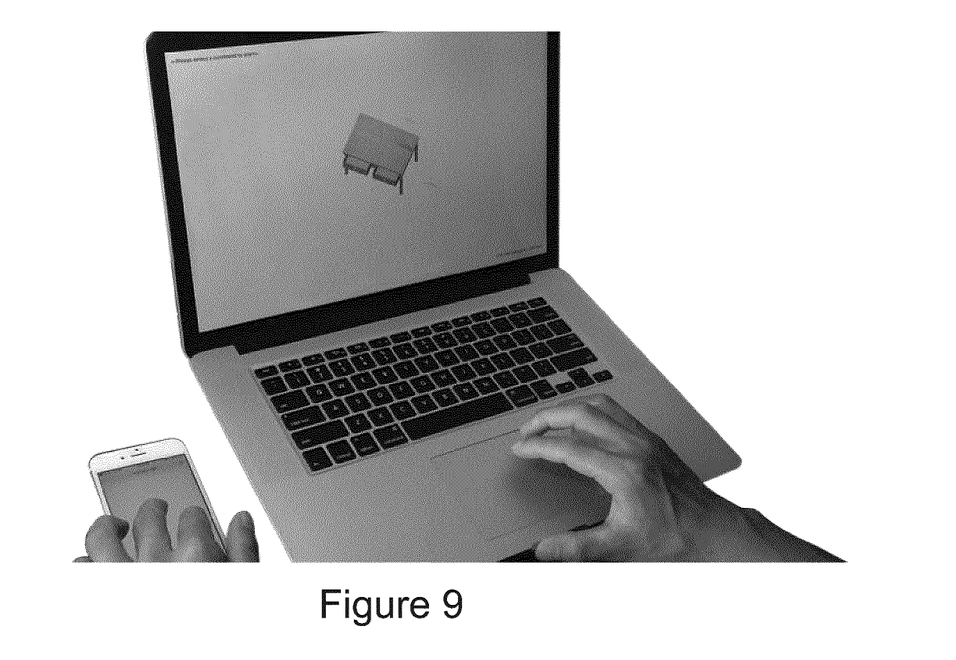

FIG. 9 is a capture made at a fourth point in time during the ongoing CG session. The user has continued the multi-point press of FIG. 8 by moving the two fingers contacting touchscreen closer together. It will be appreciated that from FIG. 8 to FIG. 9, a pinching gesture has made. This pinching gesture generates a first user command defining a zooming out view adjustment. The screen of the laptop now displays that the view setting has been adjusted in accordance with this zooming out action.

Figure 10:
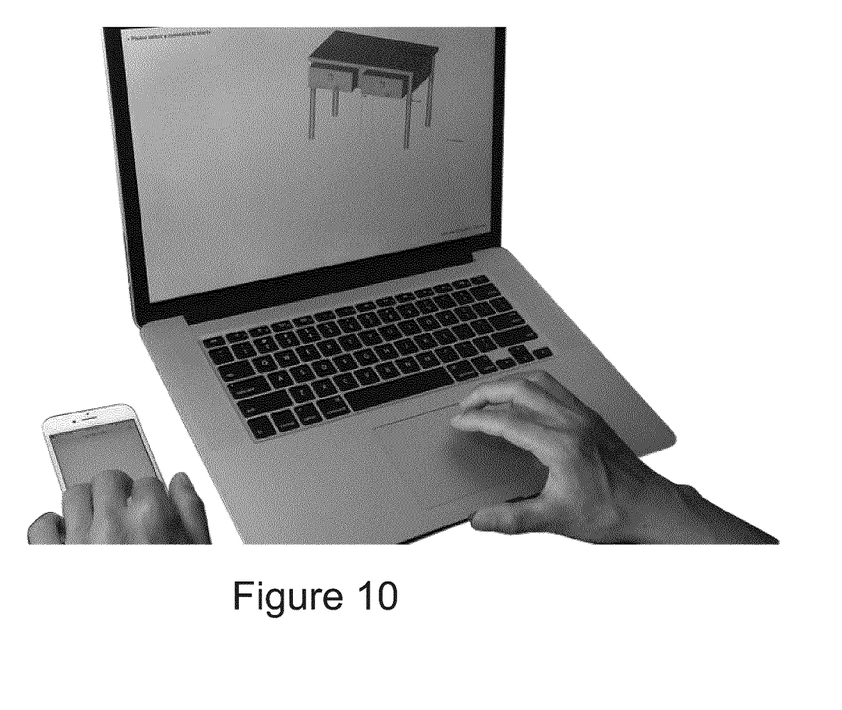

FIG. 10 is a capture made at a fifth point in time during the ongoing CG session. The user has now made a gesture of a multi-point press of the touch screen in which the two contact points are close together. The user's right hand remains suspended above the touchpad and is not currently interacting with the touchpad.

Figure 11:
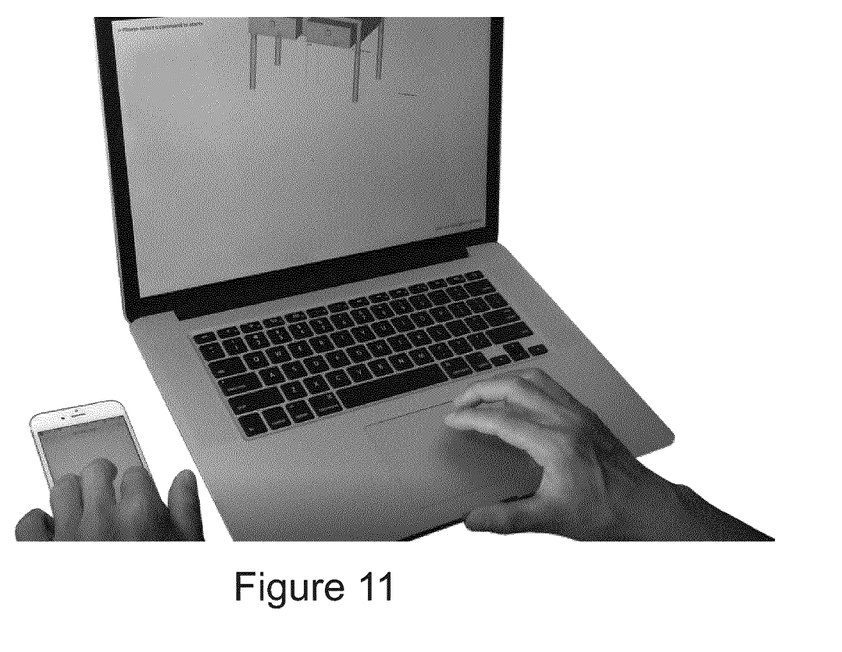

FIG. 11 is a capture made at a sixth point in time during the ongoing CG session. It will be appreciated that from FIG. 10 to FIG. 11, a dragging gesture has been made with both fingers contacting the touchscreen whereby the figures have been extended towards the top of the screen. This multi-point dragging gesture generates a first user command defining a translation view adjustment. The screen of the laptop now displays that the view setting has been adjusted to move the view downwardly (objects in the CG space are moved upwardly within the electronic display device).

Figure 12:
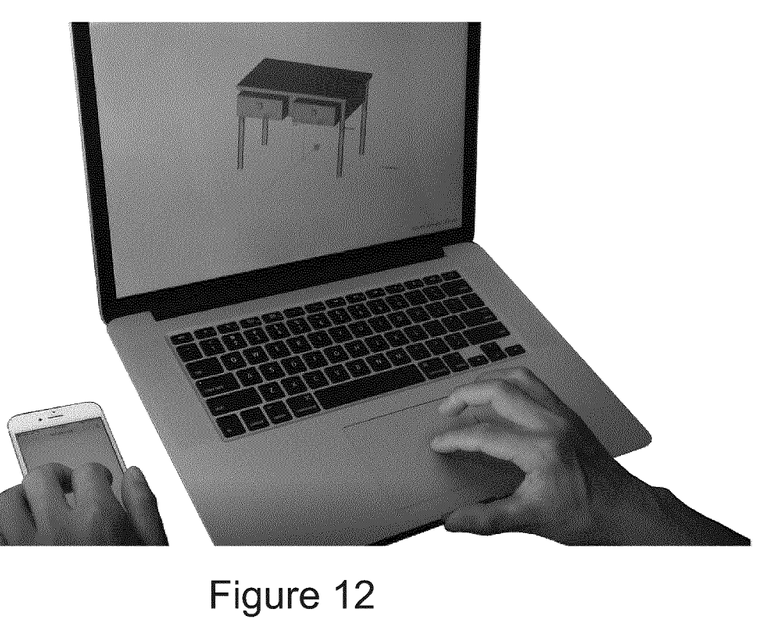

FIG. 12 is a capture made at a seventh point in time during the ongoing CG session. The user is now interacting with the touchpad of the laptop with their right hand, thereby generating a second user command. The screen of the laptop shows that the user is performing an object creation/editing action to draw a line within the CG environment.

Figure 13:
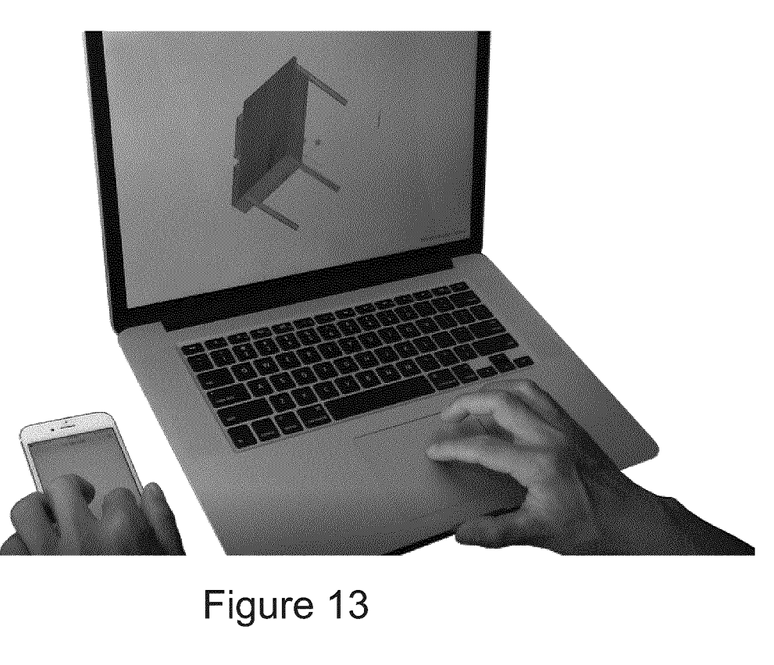

FIG. 13 is a capture made at an eighth point in time during the ongoing CG session. It will be appreciated that from FIG. 12 to FIG. 13, the user has performed a gesture on the touchscreen input device with their left hand while maintaining the right hand gesture that they had started in FIG. 12. That is, while the user is generating a second user command to draw a line, the user has at the same time interacted with the touchscreen input device to generate a first user command defining a view adjustment. It will be appreciated that the screen of the laptop shows a rotation of the view setting relative to FIG. 12, while drawing of the line (an object creation/editing action) is ongoing.

Figure 14:
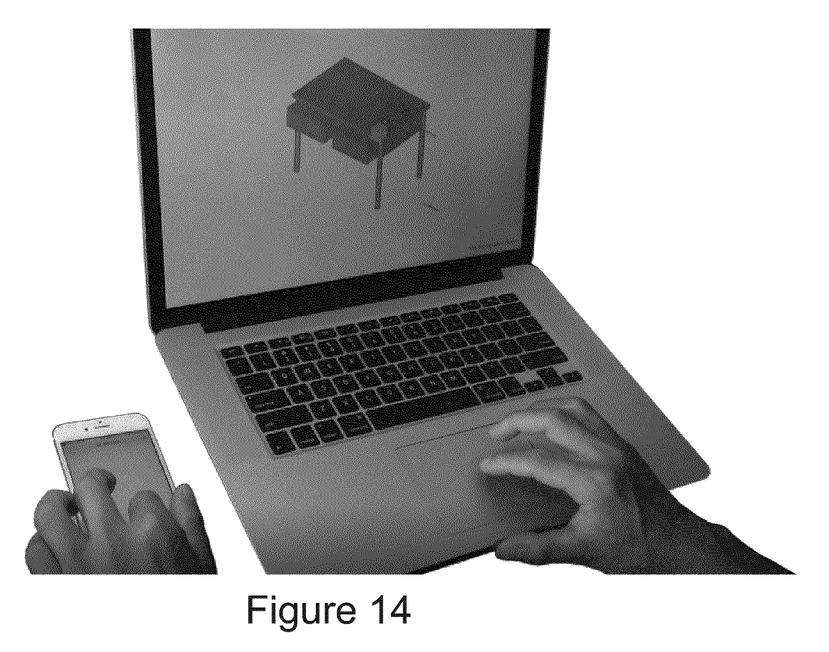

FIG. 14 is a capture made at a ninth point in time during the ongoing CG session. The user is now interacting with the touchpad of the laptop with their right hand, thereby generating another second user command. The screen of the laptop shows that the user is performing an object/editing action to draw a box within the CG environment.

Figure 15:
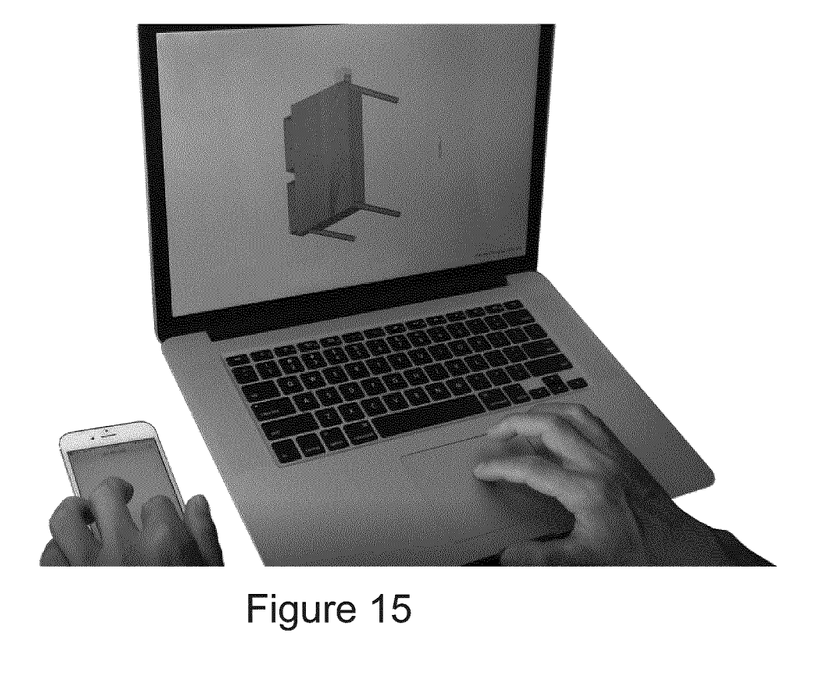

FIG. 15 is a capture made at a ninth point in time during the ongoing CG session. It will be appreciated that from FIG. 14 to FIG. 15, the user has performed a gesture of the touchscreen input device with their right hand while maintaining the right hand gesture that they had started in FIG. 14. That is, while the user is generating a second user command to draw a box, the user has at the same time interacted with the touchscreen input device to generate another user command defining a view adjustment. It will be appreciated that the screen of the laptop shows a rotation of the view setting relative to FIG. 14. As a result of this rotation, the box object to be created is now located a different location of the CG object in the shape of a table.

It will be understood that the gestures described in FIGS. 6 to 15 are representative of typical gestures made on a touchscreen. However, it will be understood that other types of gestures may also be contemplated.

Various example embodiments described herein indicate that the first user commands generated from interaction with the touch-enabled input device 8 define a view adjustment action. However, it will be understood that the first user commands generated via the touch-enabled input device 8 can also define another type of action within the CG environment, such as a creation/editing action.

Similarly, the second user commands generated from the second input device 60 can define a type of action other than a creation/editing action. This other type of action may include a view adjustment action.

Various example embodiments described herein provides for multimodal interaction during CG design in which one of the modes of interaction is via user gestures made on a touch-enabled input device. User commands defined by these gestures can be combined with a second input device, which may be an input device typically used for CG design, such as a mouse, keyboard, or input peripheral. The multimodal interaction can allow for simultaneous design actions, such as a view adjustment action and a creation/editing action, at substantially the same time while avoiding control command conflicts.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A method for processing control commands in a computer-graphics (CG) environment, the method comprising:
displaying, via a first computing device running on a first operating system, the CG environment according to a current view setting;
receiving a first user command generated from user interaction with a touch-enabled first input device, the first user command defining an adjustment to the current view setting comprising at least one of a rotation, a translation and zoom of the CG environment;
adjusting the displaying of the CG environment via the first computing device in accordance with the view adjustment defined by the first user command;
receiving a second user command generated from user interaction with a second input device other than the touch-enabled first input device, the second user command being generated in a computer mouse protocol defining a CG creation/editing action of a design object displayed within the CG environment; and
displaying, within the CG environment, application of the CG creation/editing action defined by the second user command;
wherein the touch-enabled first input device is implemented on a second computing device running on a second operating system that is separate from the first operating system;
wherein the first user command generated from user interaction with the touch-enabled first input device is received in a protocol other than the computer mouse protocol; and
wherein receiving the first user command generated from the user interaction with the touch-enabled first input device comprises:
receiving at least one captured gesture made by the user interacting with the touch-enabled input devicve; and
translating the at least one captured gesture into the first user command defining the adjustment to the view setting, wherein the at least one captured gesture is a multi-point gesture.

2. The method of claim 1, wherein the touch-enabled first input device is physically separated from the second input device; and
wherein the first user command is logically separated from the second user command.

3. The method of claim 1, wherein the first user command and second user command are generated at substantially the same time; and
wherein the view setting is adjusted in accordance with the adjustment defined by the first user command while displaying application of the CG creation/editing action defined by the second user command.

4. The method of claim 1,
wherein the second input device is embedded in the first computing device; and
wherein the touch-enabled first input device is external to the first computing device.

5. The method of claim 1, wherein the first user command and the second user command are received over independent communication channels.

6. The method of claim 1, wherein the first user command is received wirelessly from the touch-enabled first input device.

7. The method of claim 6, wherein the first user command is uploaded from the touch-enabled first input device to an external device using an internet protocol and wherein the first user command is received by the first computing system from the external device using the internet protocol.

8. The method of claim 1, wherein the second computing device is a mobile device.

9. A system for processing control commands for a computer-graphics (CG) environment, the system comprising a first computing running on a first operating system, the first computing device comprising:
- a memory for storing a plurality of instructions;
- a data storage device; and
- a processor coupled to the memory, the processor when executing the plurality of instructions being configured for:
  - displaying the CG environment according to a current view setting;
  - receiving a first user command generated from user interaction with a touch-enabled first input device, the first user command defining an adjustment to the current view setting comprising at least one of a rotation, a translation and a zoom of the CG environment;
  - adjusting the displaying of the CG environment via the first computing device in accordance with the view adjustment defined by the first user command;
  - receiving a second user command generated from user interaction with a second input device other than the touch-enabled first input device, the second user command being generated in a computer mouse protocol and defining an creation/editing action for creation/editing of a design object displayed within the CG environment; and
  - displaying, within the CG environment, application of the object creation/editing action defined by the second user command;
- wherein the touch-enabled first input devivce is implemented on a second computing device running on a second operating system that is separate from the first operating system;
- wherein the first user command generated from user interaction with the first input device is received in a protocol other than the computer mouse protocol;
- wherein receiving the first user command generated from the user interaction with the touch-enabled first input device comprises:
- receiving at least one captured gesture made by the user interacting with the touch-enabled device; and
- translating the at least one captured gesture into the first user command defining the adjustment to the view setting, wherein the at least one captured gesture is a multi-point gesture.

10. The system of claim 9, wherein the touch-enabled first input device is physically separated from the second input device; and
- wherein the first user command is logically separated from the second user command.

11. The system of claim 9, wherein the first user command and second user command are generated at substantially the same time; and
- wherein the view setting is adjusted in accordance with the adjustment defined by the first user command while displaying application of the object creation/editing action defined by the second user command.

12. The system of claim 9, wherein the second input device is embedded the first computing device; and
- wherein the touch-enabled first input device is external to the first computing device.

13. The system of claim 9, wherein the first user command and the second user command are received over independent communication channels.

14. The system of claim 9, wherein the first user command is received wirelessly from the touch-enabled first input device.

15. The system of claim 14, wherein the first user command is uploaded from the touch-enabled first input device to an external device using an internet protocol and wherein the first user command is received by the first computing system from the external device using the internet protocol.

16. The system of claim 9, wherein the second computing device is a mobile device.

17. A non-transitory computer-readable medium having stored thereon data and instructions for execution by a computer for carrying out a method for processing control commands in a computer-graphics (CG) environment, the method comprising:
- displaying, via a first computing device running on a first operating system, the CG environment according to a current view setting;
- receiving a first user command generated from user interaction with a touch-enabled first input device, the first user command defining an adjustment to the current view setting comprising at least one of a rotation, a translation and zoom of the CG environment;
- adjusting the displaying of the CG environment via the first computing device in accordance with the view adjustment defined by the first user command;
- receiving a second user command generated from user interaction with a second input device other than the touch-enabled first input device, the second user command being generated in a computer mouse protocol defining a CG creation/editing action of a design object displayed within the CG environment; and
- displaying, within the CG environment, application of the CG creation/editing action defined by the second user command;
- wherein the touch-enabled first input device is implemented on a second computing device running on a second operating system that is separate from the first operating system;
- wherein the first user command generated from user interaction with the touch-enabled first input device is received in a protocol other than the computer mouse protocol; and
- wherein receiving the first user command generated from the user interaction with the touch-enabled first input device comprises:
- receiving at least one captured gesture made by the user interacting with the touch-enabled input devicve; and
- translating the at least one captured gesture into the first user command defining the adjustment to the view setting, wherein the at least one captured gesture is a multi-point gesture.

* * * * *